(12) United States Patent
Goto et al.

(10) Patent No.: US 6,411,298 B1
(45) Date of Patent: Jun. 25, 2002

(54) METHOD AND APPARATUS FOR DETERMINING VISUAL POINT AND DIRECTION OF LINE OF SIGHT IN THREE-DIMENSIONAL IMAGE CONSTRUCTION METHOD

(75) Inventors: Yoshihiro Goto, Tokyo; Hisako Nakamura, Abiko; Makie Saito, Matsudo; Tomohiro Nagao, Kashiwa, all of (JP)

(73) Assignee: Hitachi Medical Corporation, Tokyo (JP)

(*) Notice: Subject to any disclaimer, the term of this patent is extended or adjusted under 35 U.S.C. 154(b) by 0 days.

(21) Appl. No.: 09/202,529

(22) PCT Filed: Jun. 19, 1997

(86) PCT No.: PCT/JP97/02105

§ 371 (c)(1),
(2), (4) Date: Jan. 15, 1999

(87) PCT Pub. No.: WO97/50058

PCT Pub. Date: Dec. 31, 1997

(30) Foreign Application Priority Data

Jun. 25, 1996 (JP) .............................................. 8-164901

(51) Int. Cl.⁷ .............................................. G06T 15/00
(52) U.S. Cl. ...................................... 345/427; 345/419
(58) Field of Search ................................. 345/419, 422, 345/425, 430, 427, 582, 587, 619

(56) References Cited

U.S. PATENT DOCUMENTS

| 5,694,530 A | * | 12/1997 | Goto | 345/419 |
| 5,900,878 A | * | 5/1999 | Goto et al. | 345/419 |
| 5,940,079 A | * | 8/1999 | Morino et al. | 345/430 |
| 5,953,013 A | * | 9/1999 | Shimizu | 345/419 |
| 5,990,900 A | * | 11/1999 | Seago | 345/427 |
| 6,084,589 A | * | 7/2000 | Shima | 345/419 |

FOREIGN PATENT DOCUMENTS

| JP | 8-16813 | 1/1996 |
| JP | A-8-16813 | 1/1996 |
| JP | A-9-81787 | 3/1997 |
| JP | 9-817787 | 3/1997 |

OTHER PUBLICATIONS

Kensaku Mori et al. "Virtualized Endoscope System–An Application of Virtual Reality Technology to Diagnostic Aid–." IEICE Trans. Ing. & Syst. vol. E79–D. No. 6 Jun. 1996, pp. 809–819.

* cited by examiner

Primary Examiner—Mark Zimmerman
Assistant Examiner—Huedung X Cao
(74) Attorney, Agent, or Firm—Oliff & Berridge, PLC

(57) ABSTRACT

A viewpoint is set on an intersection of two arbitrary multi-planer reconstruction (MPR) images, a line of sight is displayed on a plane including either one of the two MPR images, and the geometric positional relationship of the two MPR images, the intersection thereof, the viewpoint and the line of sight is designated with a position input device such as a mouse to thereby enable the geometric positional relationship to be rearranged.

47 Claims, 11 Drawing Sheets

F I G. 1
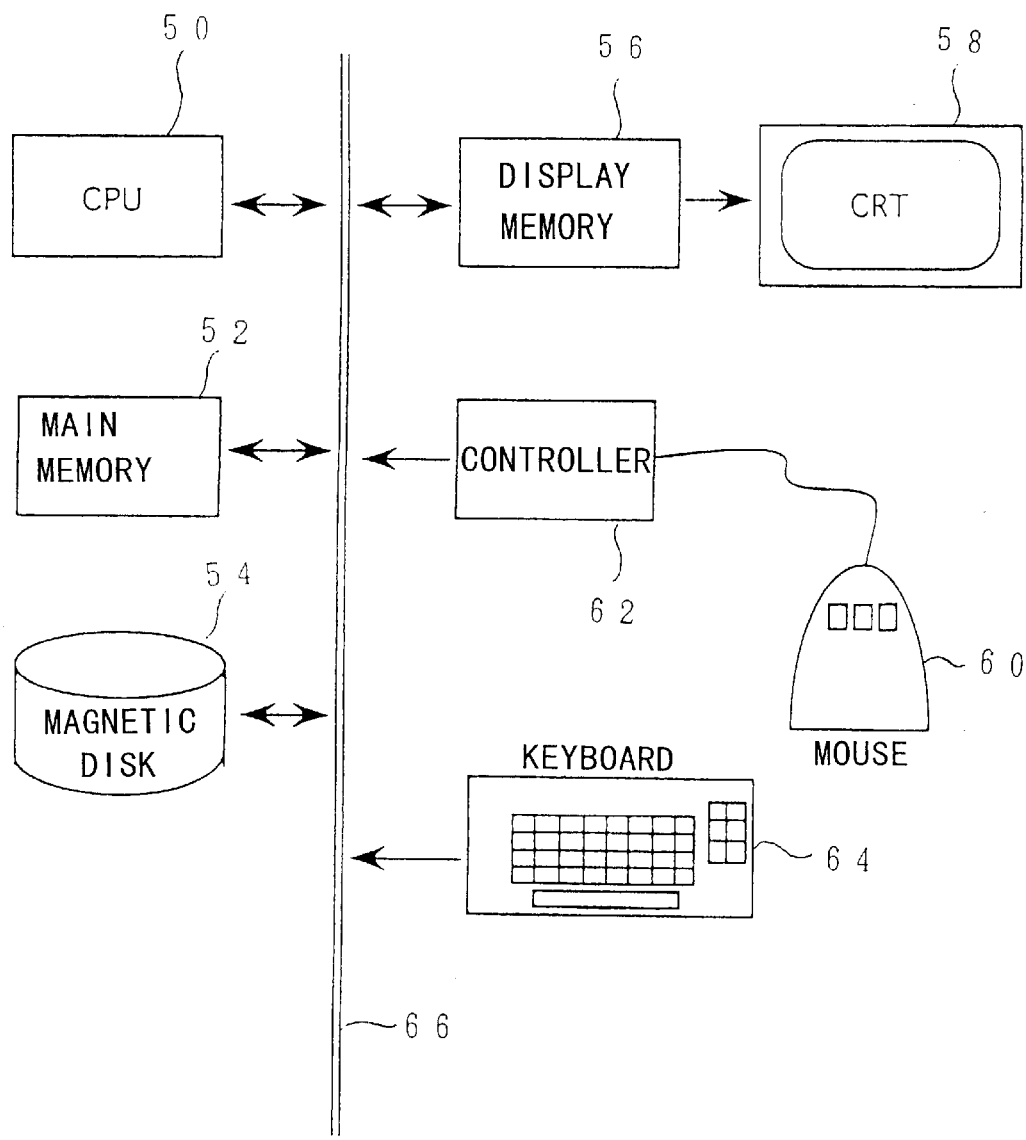

F I G. 3
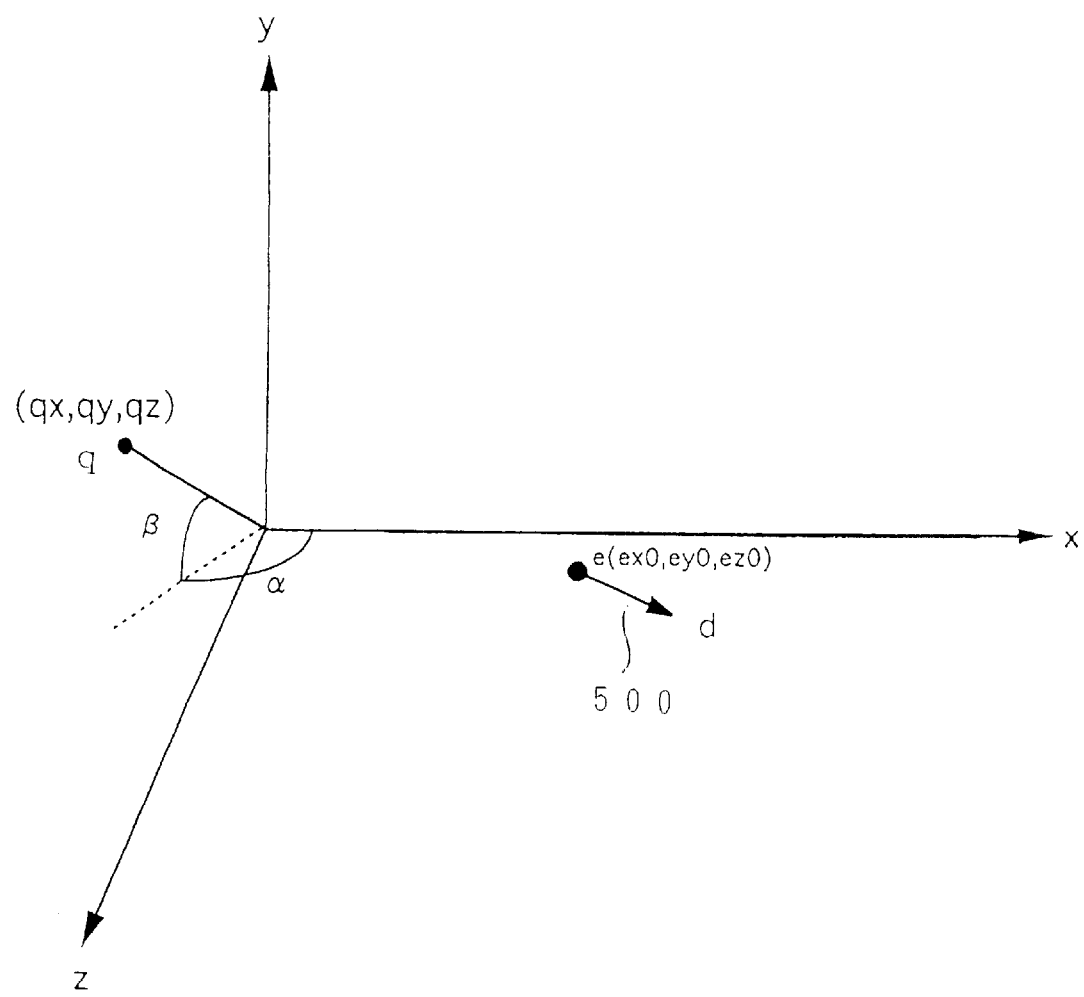

SWITCHING DISPLAY

F I G. 6(a)
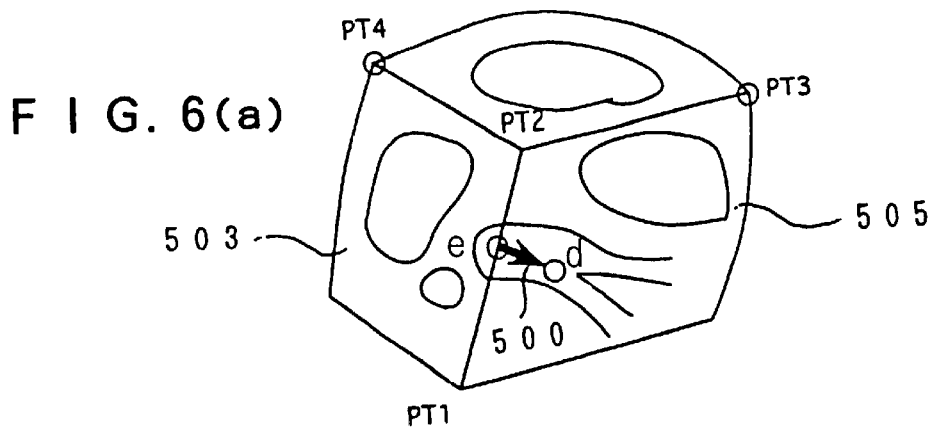
F I G. 6(b)
F I G. 6(c)
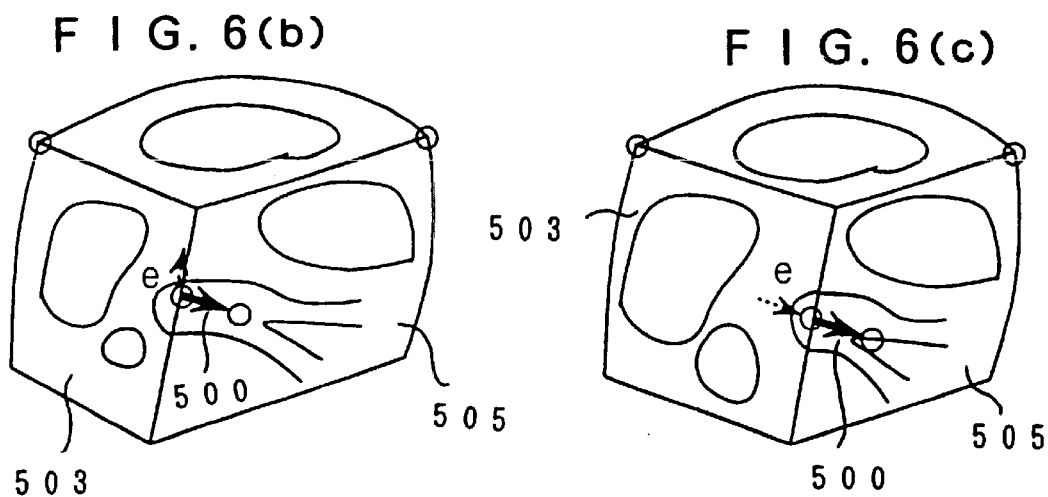
F I G. 6(d)
F I G. 6(e)
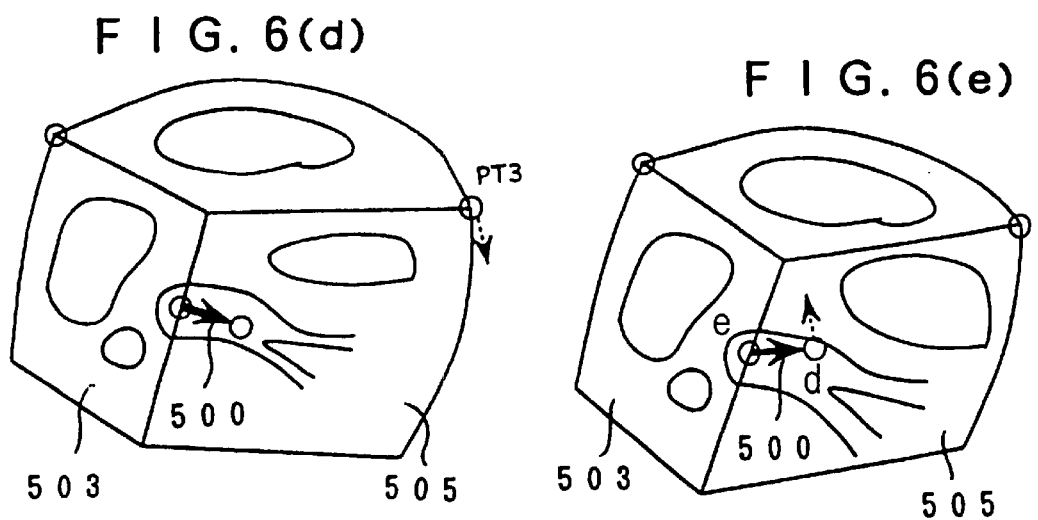

F I G. 7(a)
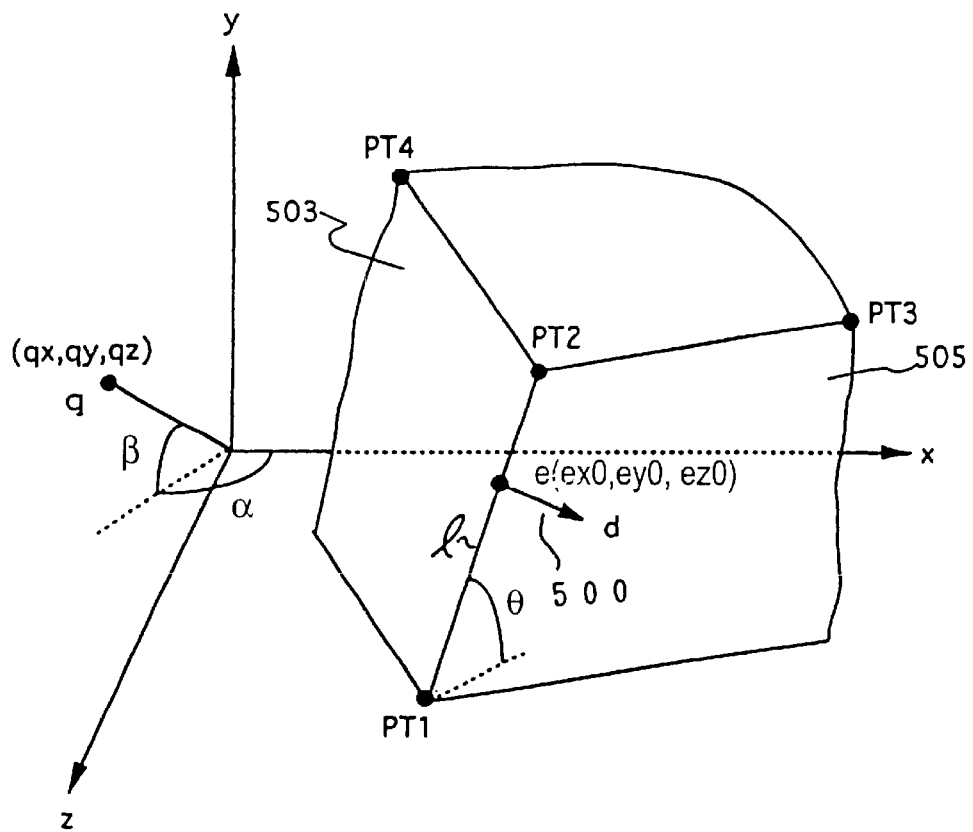
F I G. 7(b)
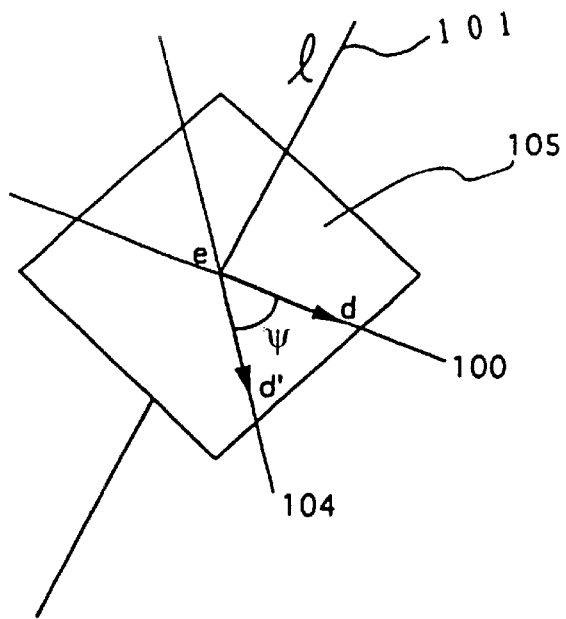

SWITCHING DISPLAY

F I G. 9
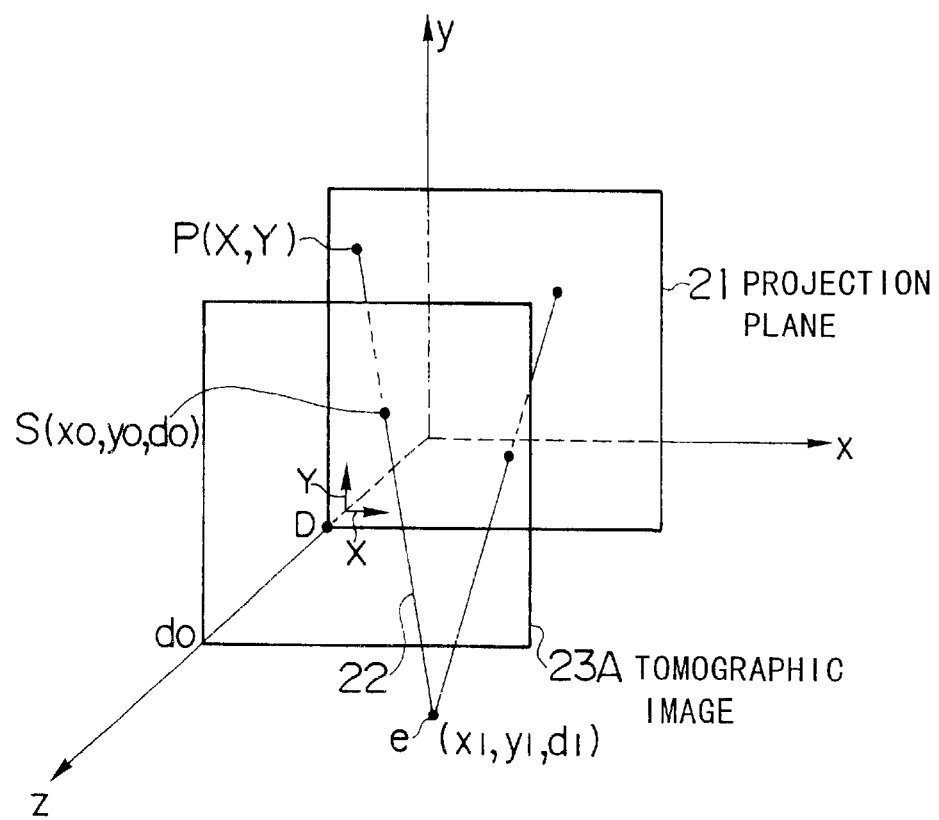

F I G. 1 1
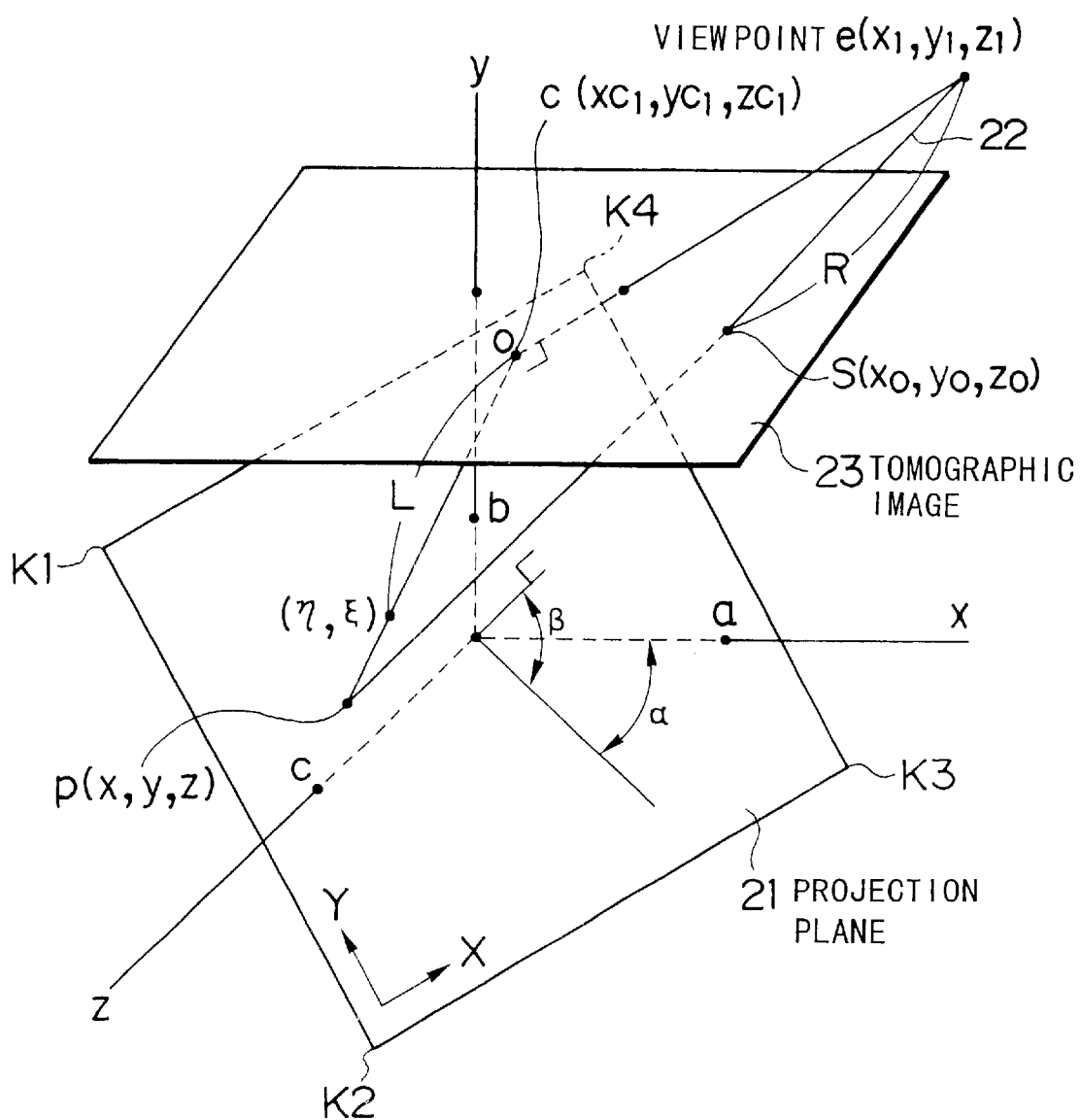

METHOD AND APPARATUS FOR DETERMINING VISUAL POINT AND DIRECTION OF LINE OF SIGHT IN THREE-DIMENSIONAL IMAGE CONSTRUCTION METHOD

FIELD OF THE INVENTION

The present invention relates generally to a method and apparatus for setting a viewpoint and a line of sight in a three-dimensional image constructing method, and more particularly to a method and apparatus for setting a viewpoint and a line of sight that are parameters required for constructing a three-dimensional image (3D image) in a central projection method.

BACKGROUND OF THE INVENTION

In the central projection method, a viewpoint is not a plane but a point, and a three-dimensional image existing between the viewpoint and a predetermined projection plane (a plane perpendicular to a line of sight) is projected on the projection plane with the viewpoint being an origin. The central projection method is suitable for obtaining the projected images that represent the endoscopic views of the interior of a blood vessel, a bronchial tube, etc. (refer to Japanese Patent Provisional Publication No. 8-16813). In the central projection method, the projected images that simulate the endoscopic movement can be obtained by properly updating the viewpoints and the lines of sight.

When the viewpoint is moved within the interior of a tube-like substance in the direction of the depth, the next viewpoint and line of sight (an angle of the projection plane) are properly set with reference to a display screen of a pseudo three-dimensional image created by the central projection method to thereby sequentially update the display screen (refer to Japanese Patent Application No. 7-231496).

An operator, however, observes the pseudo three-dimensional image, which is projected on the projection plane that is the two-dimensional plane, while setting the viewpoint and the line of sight within the pseudo three-dimensional image. For this, reason, the operator has no information about the depth in the pseudo three-dimensional image, and the operator must set the viewpoint and the line of sight after repeated trial and error in order to obtain a desired pseudo three-dimensional image. Thus, it is inefficient and takes a long time to set the viewpoint. The three-dimensional image created in the central projection method has a disadvantage in that when a display screen shows the inner wall of a blood vessel, it is difficult to recognize which blood vessel of a subject is shown. Moreover, the viewpoint strays out from the interior of the tube-like substance and enters into or over the wall when the moving distance of the viewpoint is too long. It is thus difficult to obtain the desired pseudo three-dimensional image after the movement of the viewpoint.

The present invention has been developed in view of the above-described circumstances, and has as its object the provision of a method and apparatus for setting a viewpoint and a line of sight in a three-dimensional image constructing method wherein it is easy to recognize and set the viewpoint that is used to create a pseudo three-dimensional image if an object region of a subject be endoscopically observed from inside, the viewpoint can be set in a short period of time, and the desired pseudo three-dimensional image can be obtained after the movement of the viewpoint.

SUMMARY OF THE INVENTION

To achieve the above-mentioned object, the present invention is directed to a device for setting a viewpoint and a line of sight, in a three-dimensional image constructing method including setting means for setting a viewpoint and a line of sight from the viewpoint in a stacked three-dimensional image formed by stacking a plurality of tomographic images including a volume image, the three-dimensional image constructing method comprising the steps of: shading and projecting the three-dimensional image on a projection plane perpendicular to the line of sight by using a central projection method in which an origin is the viewpoint set by the setting means; and displaying a projected image on a monitor screen as a pseudo three-dimensional image, wherein: the setting means for setting the viewpoint and the line of sight comprises: a primarily-setting means for primarily settng the viewpoint and the line of sight; an image constructing means for cnstructing a first sectional image formed by slicing the three-dimensional image with a first plane including the primarily-set viewpoint and line of sight, and displaying the first sectional image on the monitor screen; and a marker display means for displaying a marker indicating the primarily set viewpoint and line of sight on the plane including the first sectional image in accordance with the primarily-set viewpoint and line of sight.

According to the present invention, the primarily-setting means primarily-sets the viewpoint and the line of sight, and the image constructing means constructs the first sectional image that is formed by slicing the three-dimensional image with the first plane including the primarily-set viewpoint and line of sight and displays the first sectional image on the monitor screen. The marker display means displays the marker indicating the viewpoint and the line of sight on the plane including the first sectional image.

It is therefore easy to recognize and set the viewpoint and the line of sight for the pseudo three-dimensional image that is shown on the monitor screen.

By outputting an instruction to move the position and direction of the marker, and moving the marker on the plane including the first sectional image and updating the viewpoint and the line of sight in accordance with the instruction, it is easy to set the viewpoint and the line of sight, and the viewpoint and the line of sight can be set in a short period of time.

BRIEF DESCRIPTION OF THE DRAWINGS

FIG. 1 is a block diagram illustrating the hardware structure of the three-dimensional image constructing apparatus;

FIG. 3 is a view of assistance in explaining the viewpoint and the line of sight;

FIGS. 6(*a*)–6(*e*) are views of assistance in explaining a viewpoint and a line of sight;

FIGS. 7(*a*) and 7(*b*) are views of assistance in explaining the geometric calculation when viewpoints and lines of sight are changed;

FIG. 9 is a view of assistance in explaining the transformation of the pixel coordinates on a tomographic image into the coordinates on a projection plane in the three-dimensional image constructing method;

FIG. 11 is a view of assistance in explaining the coordinate transformation in the central projection method in the case where a viewpoint, a tomographic image and a projection plane have a complicated positional relationship.

THE PREFERRED EMBODIMENT OF THE PRESENT INVENTION

Figure 2:
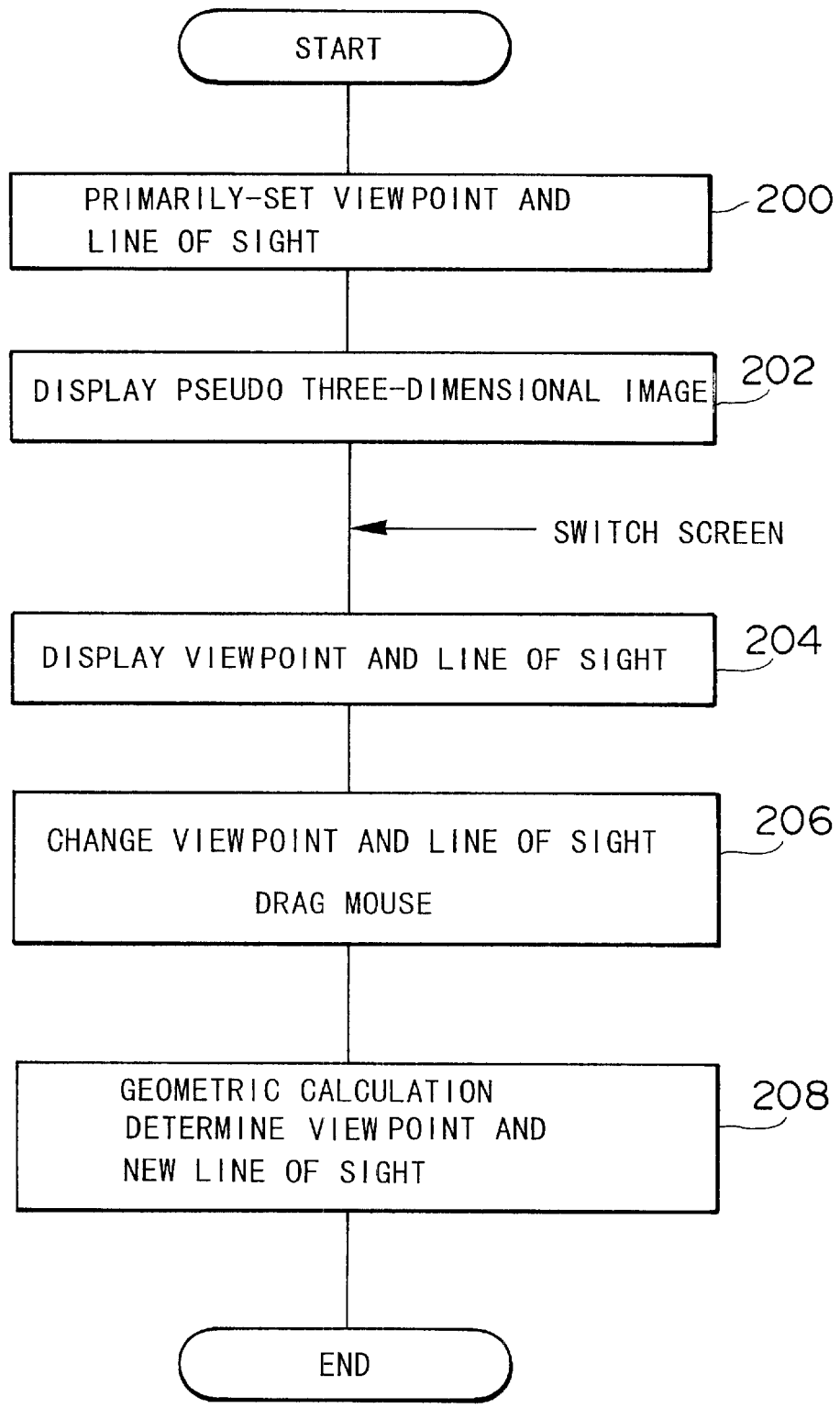
FIG. 2 is a flow chart showing the operation of the three-dimensional image constructing apparatus.

A method and apparatus according to the present invention for setting a viewpoint and a line of sight in a three-dimensional image constructing method will be described below in further detail with reference to the accompanying drawings.

First, a description will be given of the coordinate transformation in a central projection in the three-dimensional image constructing method. Every time a tomographic image is projected on a projection plane in the central projection, the pixel coordinates on the tomographic image are transformed into the coordinates on the projection plane as follows.

In an example shown in FIG. 9, a coordinate system is taken so that the projection plane, a tomographic image plane, and the x-y plane are parallel to each other for simplification of description. In FIG. 9, x, y and z are coordinate axes in the three-dimensional coordinate system (x, y, z); a point $e(x_1, y_1, d_1)$ is a position of a viewpoint e; a point P(X, Y) is a point on the projection plane (which is equivalent to a display screen) 21; and a point $S(x_0, y_0, d_0)$ is a point where a straight line 22 going through the point $e(x_1, y_1, d_1)$ and the point P(X, Y) intersects the tomographic image 23A.

D is a position (on the z-axis) of the projection plane 21, and may be set arbitrarily.

$d_0$ is a position (on the z-axis) of the tomographic image 23A, which is determined at the time of the measurement.

$d_1$ is the z coordinate of the viewpoint e.

The following equations then hold:

$$X = \frac{(D - d_1) \cdot (x_0 - x_1)}{d_0 - d_1} + x_1, \quad (1)$$

$$Y = \frac{(D - d_1) \cdot (y_0 - y_1)}{d_0 - d_1} + y_1, \quad (2)$$

$$x_0 = \frac{(d_0 - d_1) \cdot (X - x_1)}{D - d_1} + X, \text{ and} \quad (3)$$

$$y_0 = \frac{(d_0 - d_1) \cdot (Y - y_1)}{D - d_1} + Y. \quad (4)$$

When the projected image is shown in 512 pixels×512 pixels on the display screen (not illustrated) corresponding to the projection plane 21, each of X and Y takes values of −256 to +256. With respect to X and Y, $x_0$ and $y_0$ are determined on the tomographic image 23A at $d_0$ by the above equations (3) and (4), and which point should be projected is determined. Since there are a plurality of tomographic images 23A and $d_0$ accordingly takes a plurality of values, a plurality of the points $x_0$ and $y_0$ to be projected are determined with respect to one pair of X and Y.

Figure 10A:
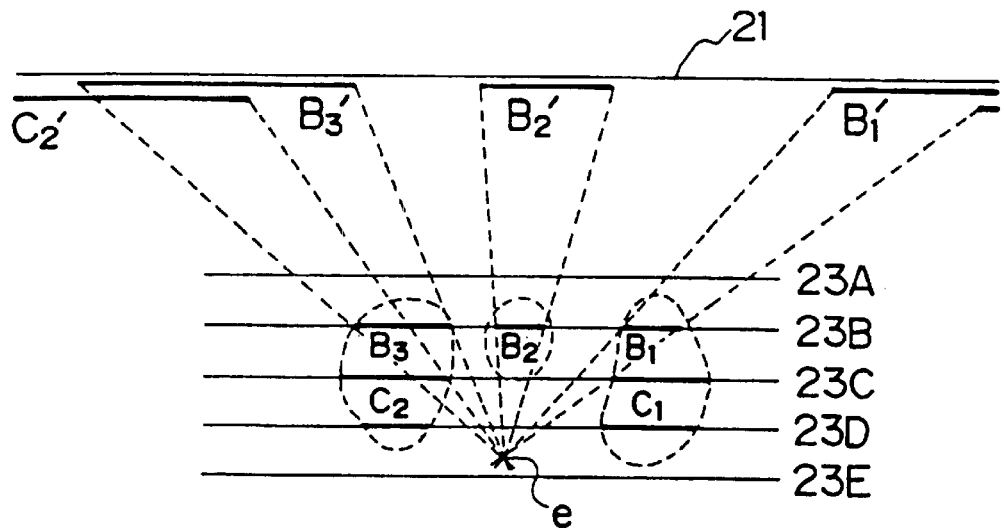
FIGS. 10(a) and 10(b) are views of assistance in explaining the transformation of the pixel coordinates on a plurality of tomographic images into the coordinates on a projection plane.

FIG. 10(a) is a view from the direction of the y-axis in the similar coordinate system in the case where tomographic images 23B–23E are provided as well as the tomographic image 23A. In FIG. 10(a), the tomographic images 23A–23E are tomographic images obtained at regular intervals (though they are at regular intervals in the illustrated example, it is not necessarily so) in one direction for the same subject. Internal organ regions $B_1$, $B_2$ & $B_3$ are boldly illustrated on the tomographic image 23B. The internal organ regions $B_1$, $B_2$ & $B_3$ are projected as $B_1'$, $B_2'$ & $B_3'$ on the projection plane 21. Likewise, internal organ regions $C_1$ & $C_2$ on the tomographic image 23C are projected as $C_1'$ & $C_2'$ on the projection plane 21.

To obtain a three-dimensional effect, when the projection data (here $B_1'$, $B_2'$ & $B_3'$ and $C_1'$ & $C_2'$) are written in a display memory (not illustrated), the projection data farther from the viewpoint e are written first, and then the projection data closer to the viewpoint e are written over them. Accordingly, the projection data $B_1'$, $B_2'$ & $B_3'$ are written first and then the projection data $C_1'$ & $C_2'$ are written over them, since the internal organ regions $B_1$, $B_2$ & $B_3$ are farther from the viewpoint e than the internal organ regions $C_1$ & $C_2$. The projection data $B_1'$, $B_2'$ & $B_3'$ and $C_1'$ & $C_2'$ are shown in FIG. 10(a) as if they were apart from the projection plane 21, this is only for the purpose of enabling the order in which the projection data $B_1'$, $B_2'$ & $B_3'$ and $C_1'$ & $C_2'$ are written to be easily understood. The projection data $B_1'$, $B_2'$ & $B_3'$, which are written first, and the projection data $C_1'$ & $C_2'$, which are written over them, are actually written on the projection plane 21.

Figure 10B:
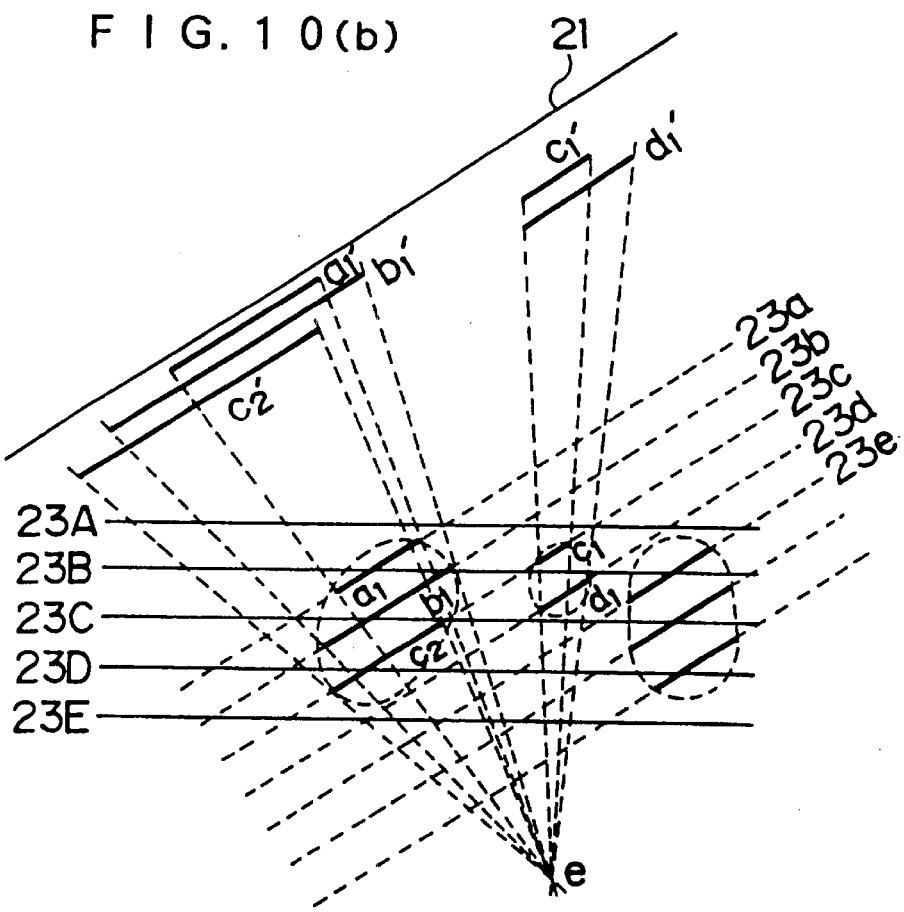

FIG. 10(b) shows a more generalized example than FIG. 10(a), and shows the case where the projection plane is not parallel with the tomographic image plane. In this case, it is necessary to produce tomographic images 23a, 23b, 23c . . . that are parallel to the projection plane 21 from the tomographic images 23A, 23B, 23C . . . by interpolation. The other procedures are the same as in FIG. 10(a). $b_1'$, $c_1'$ & $c_2'$ and $d_1'$ are projection data of the internal organ regions $b_1$, $c_1$ & $c_2$ and $d_1$, respectively, on the tomographic images 23b, 23c and 23d produced by the interpolation.

FIG. 11 is a view of assistance in explaining the coordinate tranformation in the central projection method when the viewpoint, the tomographic image and the projection plane have a more complicated positional relationship. A point $S(x_0, y_0, z_0)$ on the tomographic image 23 is projected as a point P(x, y, z) on the projection plane.

Referring to FIG. 11, when the tomographic image 23 is projected on the projection plane 21 in the central projection method, the pixel coordinates on the tomographic image 23 are transformed into the coordinates on the projection plane 21 as follows.

$$\frac{x}{a} + \frac{y}{b} + \frac{z}{c} = 1. \quad (5)$$

The line 22 going through the point $e(x_1, y_1, z_1)$ and the point P(x, y, z) is given by $$\frac{x_0 - x}{x_1 - x} = \frac{y_0 - y}{y_1 - y} = \frac{z_0 - z}{z_1 - z}. \quad (6)$$

When the projection plane 21 goes through a point $C1(x_{C1}, y_{C1}, z_{C1})$, $$z = \frac{X \cdot k_1 - Y \cdot k_2 - y_{C1} \cdot k_3 - \frac{ci \cdot k_3 \cdot z_{C1}}{bi} + \frac{ai \cdot k_3 \cdot X}{bi \cdot \cos\alpha} - \frac{ai \cdot k_3 \cdot x_{C1}}{bi}}{1 - \frac{ci \cdot k_3}{bi} + \frac{ai \cdot k_3 \cdot \sin\alpha}{bi \cdot \cos\alpha}}, \quad (7)$$

$$x = \frac{X - z \cdot \sin\alpha}{\cos\alpha}, \quad \text{and} \quad (8)$$

$$y = \frac{y_{C1} + \{-ci \cdot (z - z_{C1}) - ai \cdot (x - x_{C1})\}}{bi}; \quad (9)$$

where $k_1 = \sin\alpha$, $k_2$ $$k_2 = \frac{\cos\alpha}{\sin\beta}, \quad k_3 = \frac{\cos\alpha \cdot \cos\beta}{\sin\beta}, \quad ai = \frac{1}{a}, \quad bi = \frac{1}{b}, \quad \text{and } ci = \frac{1}{c}.$$

Here the point $C1(x_{C1}, y_{C1}, z_{C1})$ may be such a point where the projection plane 21 intersects a perpendicular line drawn from the viewpoint $e(x_1, y_1, z_1)$ to the projection plane 21 (the point is at a distance h from the viewpoint e):

$$z_{C1} = z_1 \pm \frac{h}{\sqrt{1 + \frac{c^2}{a^2} + \frac{c^2}{b^2}}} \quad (10)$$

("−" in "$z_1 \pm$" is valid when $z_0 < z_{C1}$), $$x_{C1} = x_1 + \frac{c \cdot (z_1 - z_{C1})}{a}, \quad \text{and} \quad (11)$$

$$y_{C1} = y_1 + \frac{c \cdot (z_1 - z_{C1})}{b}. \quad (12)$$

When the projected image is shown in 512 pixels×512 pixels on the display screen (not illustrated) corresponding to the projection plane 21, each of X and Y takes values of −256 to +256. With respect to X and Y, x and y are determined by the above equations (7), (8) and (9). Since $x_1$, $y_1$, $z_1$ of the point e are determined arbitrarily, the coordinates $x_0$, $z_0$ of the pixel point S are determined on the tomographic image of $y_0 = d_0$ by the following equations (13) and (14):

$$x_0 = \frac{(d_0 - y) \cdot (x_1 - x)}{y_1 - y} + x, \quad \text{and} \quad (13)$$

$$z_0 = \frac{(d_0 - y) \cdot (z_1 - z)}{y_1 - y} + z. \quad (14)$$

Since there are a plurality of tomographic images and $d_0$ accordingly takes a plurality of values, a plurality of the points $x_0$ and $y_0$ to be projected are determined with respect to one pair of X and Y.

In FIG. 11, R represents the distance from the viewpoint e to the point S, and R is a parameter for obtaining a pixel value (luminance) at the point P. The pixel value at the point P is proportional to a value that is obtained by subtracting R from the maximum value $R_{max}$ of the set pixel value (luminance). Since the point P corresponds to a point $(\eta, \xi)$ in the display memory, the pixel value is stored at the point $(\eta, \xi)$.

The above-described coordinate transformation is performed for all points on the projection plane 21, which is equivalent to the display screen, and for all the tomographic images 23. The coordinate transformation may also be performed for the constructed three-dimensional image, or for each of the tomographic images before the construction.

A description will be given of a three-dimensional image constructing apparatus according to the present invention. FIG. 1 is a block diagram illustrating the hardware structure of the three-dimensional image constructing apparatus. The three-dimensional image constructing apparatus records and displays medical image data, which is collected for an object region of the subject in a medical image diagnostic device such as an X-ray CT device and an MRI device. The three-dimensional image constructing apparatus comprises: a central processing unit (CPU) 50, which controls each component; a main memory 52, which contains a control program for the apparatus; a magnetic disk 54, which contains a plurality of tomographic images, an image reconstruction program, etc.; a display memory 56, which contains the reconstructed image data for display; a CRT 58, which is used as a display for showing the image data from the display memory 56; a mouse 60, which is used as a position input device; a mouse controller 62, which detects the state of the mouse 60 and outputs signals representing the position of a mouse pointer on the CRT 58, the state of the mouse 60, etc. to the CPU 50; a keyboard 64 for receiving a variety of operational instructions; and a common bus 66, which connects the above-mentioned components.

A description will be given of the operation of the three-dimensional image constructing apparatus, which is constructed in the above-mentioned manner, with reference to the flow chart of FIG. 2.

First, the viewpoint and the line of sight are set to three-dimensionally display the internal organs of the subject on the CRT 58 (step 200). Specifically, the image data of tomographic images in the object region of the subject is read from the magnetic disk 54, and the tomographic images in the object region are sequentially displayed on the CRT 58. The operator designates the viewpoint e by operating the mouse 60 when a desired tomographic image is displayed. The operator enters the angles α and β, which represent the line of sight from the viewpoint e, through the keyboard 64.

Specifically, in order to set the viewpoint e at the starting point of an arrow 500 and set the line of sight in the direction indicated by the arrow 500 as shown in FIG. 3, the operator sets the coordinates of the viewpoint $e(ex_0, ey_0, ez_0)$ in a three-dimensional coordinate system (x, y, z) (hereinafter referred to as an absolute coordinate system) that is set in a space where the subject is placed, with the mouse 60 on the display screen showing the desired tomographic image as described previously. When a point on a straight line that goes through the origin and is directed in the line of sight (the same direction as the arrow 500) is q(qx, qy, qz), the angle a between the x-axis and a line formed by projecting a line Oq on the x-z plane and the angle β between the line Oq and the x-z plane are entered through the keyboard 64 so as to set the line of sight.

Upon the entering of the viewpoint e and the line of sight, the CPU 50 reads the image data of the tomographic images from the magnetic disk 54, and constructs a pseudo three-dimensional image that is obtained when the interior of the organ is seen from the viewpoint e in the line of sight in the above-mentioned central projection method. The pseudo three-dimensional image is then outputted to the display memory 56, and the pseudo three-dimensional image as shown in FIG. 4(*a*) is displayed on the CRT 58 (step 202 in FIG. 2).

Next, on the screen showing the pseudo three-dimensional image, to confirm the viewpoint e or the line of sight for the pseudo three-dimensional image or to change the viewpoint e or the line of sight, the operator directs with the mouse 60 or the keyboard 64 that the screen be switched. Upon the directing to switch the screen, a screen showing the viewpoint e and the line of sight in the absolute coordinate system as shown in FIG. 4(b) is displayed on the CRT 58 (step 204 in FIG. 2). On this display screen, sectional images, which are formed by slicing the object region with a plane 503 that includes the viewpoint e and is vertical to the line of sight and with a plane 505 that includes the viewpoint e and the line of sight, are displayed in a parallel projection method as well as the arrow 500, which indicates the viewpoint e and the line of sight. In the parallel projection method, the object region is parallelly projected on a projection plane (a viewpoint plane) that is set in a preset direction represented by angles $\theta_1$ and $\theta_2$ in the absolute coordinate system (x, y, z) as shown in FIG. 5. This projection plane may be rotated arbitrarily in accordance with instructions entered through the keyboard 64.

Figure 4A:
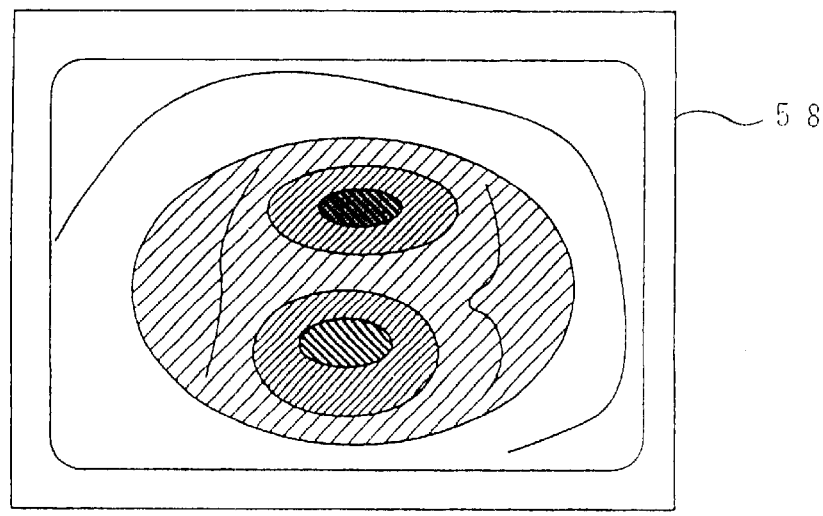
FIGS. 4(*a*) and 4(*b*) show a pseudo three-dimensional image and a sectional image representing a viewpoint and a line of sight.
Figure 4B:
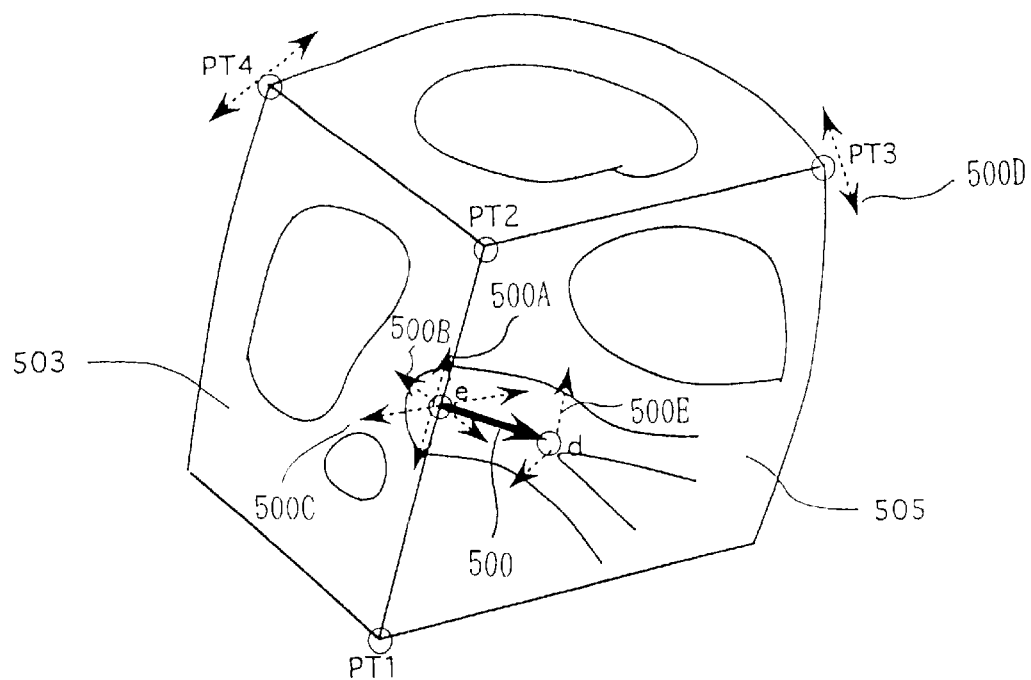
Figure 5:
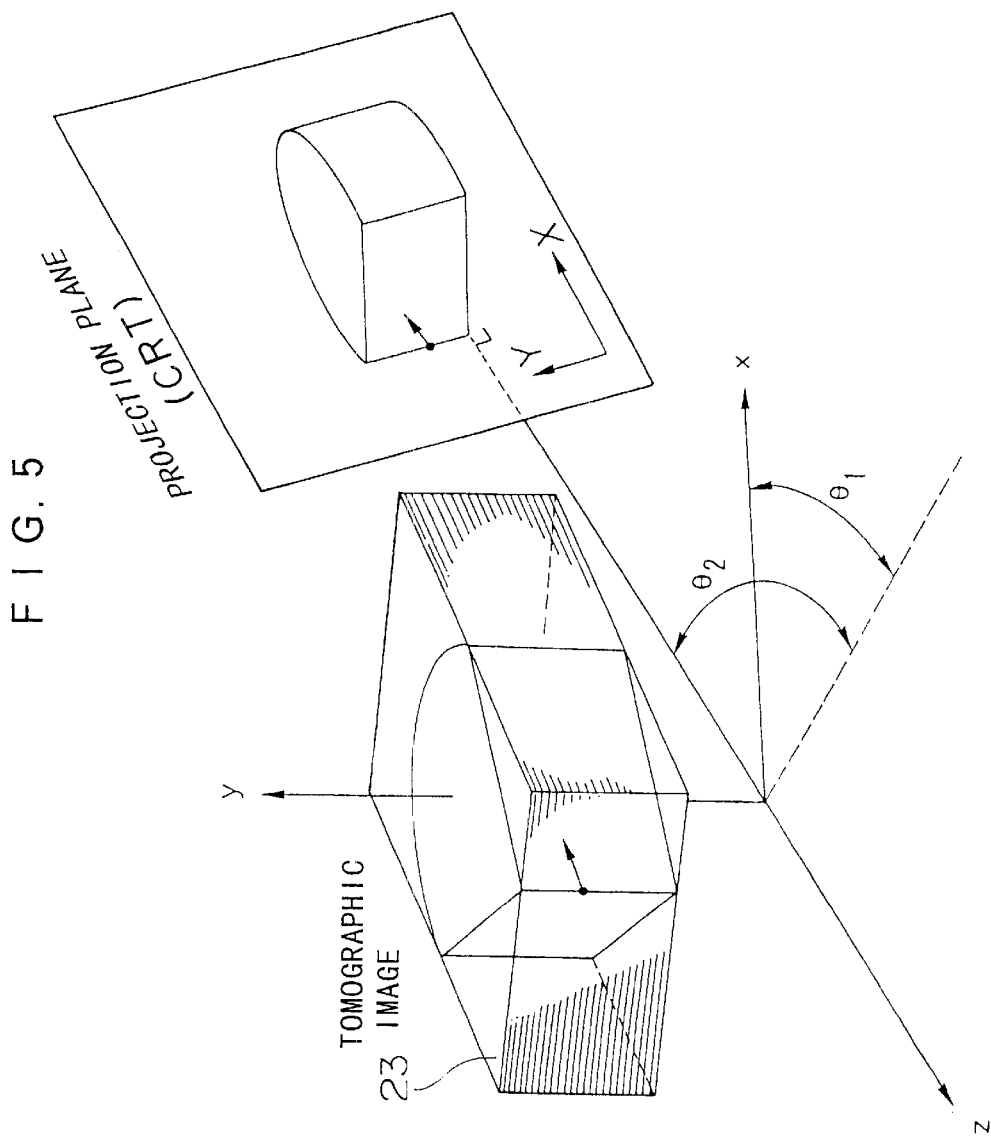
FIG. 5 is a view of assistance in explaining a parallel projection method.
Figure 8:
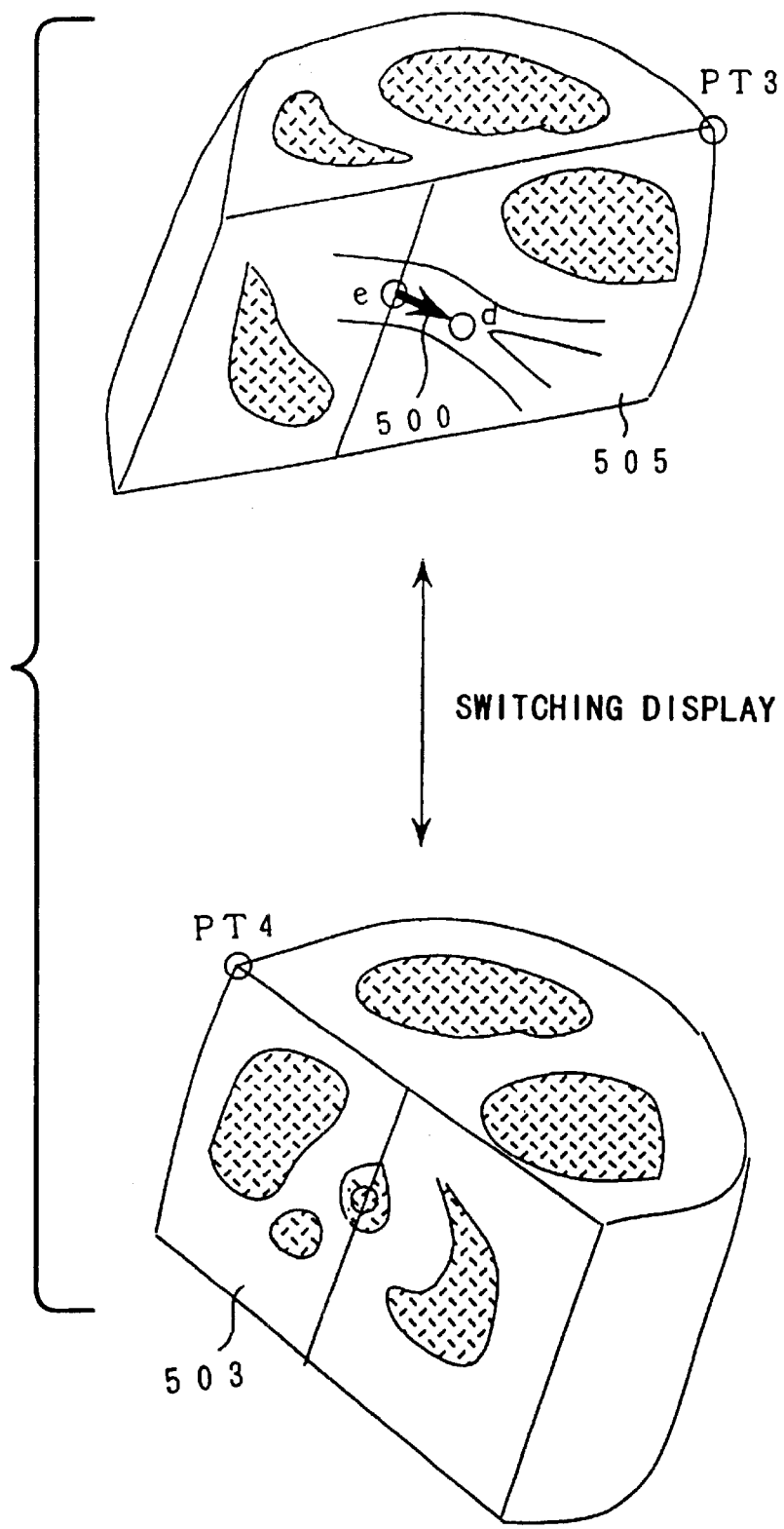
FIG. 8 is a view showing an example for displaying sectional images representing a viewpoint and a line of sight.

In FIGS. 4(a) and 4(b), the images are switched and displayed, but they may also be arranged and displayed side by side vertically or horizontally on the same screen.

The operator can confirm the viewpoint e and the line of sight on the screen and change the viewpoint e and the line of sight. When the operator directs that the screen be switched again with the mouse 60 or the keyboard 64 on the screen showing the viewpoint e and the line of sight, the pseudo three-dimensional image is displayed again.

To display the screen as shown in FIG. 4(b), the CPU 50 performs calculations as described below. Upon the directing to switch to the screen shown in FIG. 4(b) as described above, the CPU 50 performs geometric calculations to find equations for the arrow 500, the plane 503 and the plane 505.

A description will be given of a line segment (a straight line) indicating the direction of the arrow 500. The CPU 50 finds the point q(qx, qy, qz) from $\alpha$ and $\beta$, which indicate the line of sight and are entered through the keyboard 64 or are given as constants in the program, as described on FIG. 3. The CPU 50 then finds a line segment (a straight line) that goes through the viewpoint $e(ex_0, ey_0, ez_0)$, which is entered through the mouse 60 or is given as a constant in the program, and is parallel to the straight line that goes through the point q(qx, qy, qz) and the origin.

The straight line is given by $$\frac{x - ex_0}{qx} = \frac{y - ey_0}{qy} = \frac{z - ez_0}{qz}, \quad (100)$$

where qx=cos $\beta$·cos $\alpha$, qy=sin $\beta$, and qz=cos $\beta$·sin $\alpha$.

The coordinate point that the line segment (the straight line) indicating the direction of the arrow 500 goes through is found by the above equation.

Then, before the equations for the plane 503 and the plane 505 are found, a straight line l that is the intersection of these planes is found. The straight line l is given by $$\frac{x - ex_0}{L} = \frac{y - ey_0}{M} = \frac{z - ez_0}{N}, \quad (101)$$

where L, M and N are relative values (values obtained by multiplying by a real number are permissible) that satisfy both the following equations:

$L \cdot qx + M \cdot qy + N \cdot qz = 0$ (the condition in which the straight line given by the equation (100) and the straight line l given by the equation (101) are perpendicular to each other); and $$\sin\theta = \frac{M}{\sqrt{L^2 + M^2 + N^2}},$$

where $\theta$ is an angle between the straight line l and the x-z plane, and an initial value of $\theta$ may be entered through the keyboard 64 or may be given as a constant in the program.

In view of the condition in which the plane 503 includes the viewpoint $e(ex_0, ey_0, ez_0)$ and is perpendicular to the line of sight, the plane 503 is given by $$qx \cdot (x - ex_0) = qy \cdot (y - ey_0) = qz \cdot (z - ez_0). \quad (102)$$

The plane 505 is given by $$A \cdot (x - ex_0) = B \cdot (y - ey_0) = C \cdot (z - ez_0), \quad (103)$$

where A, B and C are relative values that satisfy the following equations:

$A \cdot qx + B \cdot qy + C \cdot qz = 0$, in view of the condition in which the equation of the plane 505 is parallel to the line of sight; and $A \cdot L + B \cdot M + C \cdot N = 0$, in view of the condition in which the equation of the plane 505 is parallel to the straight line l.

The sectional images on the plane 503 and the plane 505 of the object region are constructed from the equations of the plane 503 and the plane 505 in a multiplaner reconstruction (MPR) method.

Consequently, the screen shown in FIG. 4(b) is obtained from the arrow 500 and surface images of the object region sliced with the plane 503 and the plane 505 and is displayed on the CRT 58. Arrows shown with dotted lines in FIG. 4(b) represent the directions that may be designated with the mouse 60 or the keyboard 64 when the viewpoint e and the line of sight are changed as described below. Actually, these arrows are not displayed as shown in FIG. 5(a).

The borderlines between the sections shown in FIG. 4(b) may be either displayed or not. The images including the sections shown in FIG. 4(b) are not restricted to MPR images, but they may be formed in a depth method or a volume rendering method.

A description will be given of the case where the viewpoint e or the line of sight is changed on the screen in FIG. 4(b). To change the viewpoint e or the line of sight, the position or direction of the arrow 500 is moved on the screen with the mouse 60, etc. (step 206 in FIG. 2). Consequently, the CPU 50 detects the changed position and direction of the arrow 500, determines a new viewpoint e and line of sight, and constructs a pseudo three-dimensional image with respect to the viewpoint e and the line of sight as described previously (step 208 in FIG. 2).

First, a description will be given of the case where the viewpoint e is changed. The staring point of the arrow 500 is dragged in the direction indicated by a dotted arrow 500 A in FIG. 4(b) with the mouse 60, and the viewpoint e is moved along the straight line l. Or, the starting point of the arrow 500 is moved in the direction indicated by a dotted arrow 500B or 500C in accordance with an instruction entered through the keyboard 64, and the viewpoint e is moved within the plane 503 or the plane 505 in the direction parallel to the x-z plane. The viewpoint e is thus moved to an arbitrary position. For instance, when the viewpoint e in FIG. 6(a) is moved along the straight line l as shown in FIG. 6(b), $$x = ex_0 + L \cdot v,$$

$$y = ey_0 + M \cdot v,$$

and $$z = ez_0 + N \cdot v;$$

where the equation (100) for the straight line 1 is written as $$\frac{x - ex_0}{L} = \frac{y - ey_0}{M} = \frac{z - ez_0}{N} = v.$$

Hence, the new viewpoint is determined by making v proportional to the distance dragged with the mouse 60.

When the viewpoint e is moved within the plane 503 in parallel with the x-z plane as shown in FIG. 6(c), the viewpoint e may be changed along a straight line that goes through the viewpoint e and is perpendicular to the straight line 1 just as in the case where the viewpoint e is moved along the straight line 1 as described previously.

A description will be given of the case where the line of sight is changed. PT3 in FIG. 4(b) is dragged with the mouse 60 in a direction indicated by a dotted arrow 500D in FIG. 4(b), and the line of sight is rotated as well as the plane 505 about the straight line 1 as a rotational axis. Or, an end d of the arrow 500 is dragged with the mouse 60 in a direction indicated by a dotted arrow 500E in FIG. 4(b), and the line of sight is rotated within the plane 505. As a result, the line of sight can be changed to an arbitrary direction.

For instance, when PT3 is dragged with the mouse 60 as shown in FIG. 6(d) to rotate the line of sight about the straight line 1 as the rotational axis, the line of sight rotates about the straight line 1 at an angle Ψ that is proportional to the distance dragged with the mouse 60 (see FIG. 7(b)).

A straight line parallel to the new line of sight is given by $$\frac{x - ex_0}{qx'} = \frac{y - ey_0}{qy'} = \frac{z - ez_0}{qz'}, \quad (104)$$

where qx', qy' and qz' are relative values that satisfy the following equations:

$$qx'^2 + qy'^2 + qz'^2 = 1;$$

since the new line of sight is parallel to a plane that is perpendicular to the straight line 1, includes the viewpoint e and is given by $$L \cdot (x - ex_0) + M \cdot (y - ey_0) + N \cdot (z - ez_0) = 0, \quad (105)$$

then $$qx' \cdot L + qy' \cdot M + qz' \cdot N = 0;$$

and since the new line of sight intersects with the straight line (100) at the angle Ψ, $$\cos \Psi = qx' \cdot qx + qy' \cdot qy + qz' \cdot qz.$$

Accordingly, α' and β' representing the new line of sight are given as angles that satisfy the following equations:

$$qx' = \cos \beta' \cdot \cos \alpha',$$

$$qy' = \sin \beta',$$

and $$qz' = \cos \beta' \cdot \sin \alpha'.$$

The plane 505 is naturally reset parallel to the new line of sight (refer to the equation (103)). The plane 503 may be reset at a right angle to the plane 505 by means of the equation (102), but it may not necessarily be reset at a right angle.

When the end d of the arrow 500 is dragged with the mouse 60 as shown in FIG. 6(e) to rotate the line of sight within the plane 505, the line of sight is rotated within the plane 505 at the angle Ψ that is proportional to the distance dragged with the mouse 60.

A straight line parallel to the new line of sight is given by $$\frac{x - ex_0}{qx'} = \frac{y - ey_0}{qy'} = \frac{z - ez_0}{qz'}, \quad (104)$$

where qx', qy' and qz' are relative values that satisfy the following equations:

$$qx'^2 + qy'^2 + qz'^2 = 1;$$

since the new line of sight is parallel to the plane 505, which is given by $$A \cdot (x - ex_0) + B \cdot (y - ey_0) + C \cdot (z - ez_0) = 0,$$

then $$qx' \cdot A + qy' \cdot B + qz' \cdot C = 0;$$

and since the new line of sight intersects with the straight line (100) at the angle Ψ, $$\cos \Psi = qx' \cdot qx + qy' \cdot qy + qz' \cdot qz.$$

Accordingly, the new line of sight α' and β' are given as angles that satisfy the following equations:

$$qx' = \cos \beta' \cdot \cos \alpha',$$

$$qy' = \sin \beta',$$

and $$qz' = \cos \beta' \cdot \sin \alpha'.$$

The plane 503 may be reset at a right angle to the line of sight by means of the equation (102), but it may not necessarily be reset at a right angle.

After the viewpoint e or the line of sight is thus changed, upon directing to switch the screen with the mouse 60 or the keyboard 64, the pseudo three-dimensional image showing the interior of the organ is constructed in accordance with the new viewpoint and line of sight and displayed on the CRT 58.

To see a broader area around the viewpoint, a sectional image that is formed by slicing the object region with a plane (equivalent to the plane 503) including the viewpoint e and perpendicular to the line of sight, and a sectional image that is formed by slicing the object region with a plane (equivalent to the plane 505) including the viewpoint e and the line of sight may be switched and displayed alternately.

INDUSTRIAL APPLICABILITY

As set forth hereinabove, according to the present invention, the viewpoint and the line of sight are primarily-set, the first sectional image is constructed that is formed by slicing the three-dimensional image with the first plane including the primarily-set viewpoint and line of sight, and the first sectional image is displayed on the monitor screen.

Then, the marker indicating the viewpoint and the line of sight is displayed on the plane including the first sectional image. It is therefore easy to recognize and set the viewpoint and the line of sight for the pseudo three-dimensional image shown on the monitor screen.

Moreover, by outputting the instruction to move the position and direction of the marker, and moving the marker on the plane including the first sectional image and updating the viewpoint and the line of sight in accordance with the instruction, it is easy to set the viewpoint and the line of sight, and the viewpoint and the line of sight can be set in a short period of time.

We claim:

1. A method of setting a viewpoint and a line of sight, in a three-dimensional image constructing method comprising the steps of: setting a viewpoint and a line of sight from the viewpoint in an original image formed by stacking a plurality of tomographic images including a volume image; projecting the original image on a projection plane perpendicular to the line of sight from an origin being the viewpoint; and displaying the projected image on a monitor screen as a pseudo three-dimensional image, wherein the step of setting the viewpoint and the line of sight of the displayed pseudo three-dimensional image comprises the steps of:

constructing a first sectional image including the viewpoint of the displayed pseudo three-dimensional image;

constructing a second sectional image parallel to the line of sight of the displayed pseudo three-dimensional image;

displaying the first sectional image and the second sectional image on the monitor screen as an assistant image assisting to reset the viewpoint and the line of sight; and displaying information indicating at least the viewpoint and the line of sight on the assistant image.

2. The method of setting the viewpoint and the line of sight in the three-dimensional image constructing method as defined in claim 1, wherein the step of setting the viewpoint and the line of sight further comprises the steps of: moving the information on the assistant image according to a command to move at least one of the viewpoint and the line of sight, and resetting the at least one of the viewpoint and the line of sight.

3. The method of setting the viewpoint and the line of sight in the three-dimensional image constructing method as defined in claim 1, wherein the step of setting the viewpoint and the line of sight further comprises the steps of: turning the assistant image around an intersection of the first sectional image and the second sectional image by a designated angle according to a command to turn the assistant image around the intersection by the designated angle, and resetting at least the line of sight.

4. The method of setting the viewpoint and the line of sight in the three-dimensional image constructing method as defined in claim 1, wherein the step of setting the viewpoint and the line of sight further comprises the steps of:

displaying the viewpoint on an intersection of the first sectional image and the second sectional image; and moving the viewpoint along the intersection, and resetting at least the viewpoint.

5. The method of setting the viewpoint and the line of sight in the three-dimensional image constructing method as defined in claim 1, wherein the step of setting the viewpoint and the line of sight further comprises the steps of: translating an intersection of the first sectional image and the second sectional image on one of the first sectional image and the second sectional image, and resetting at least the viewpoint.

6. The method of setting the viewpoint and the line of sight in the three-dimensional image constructing method as defined in claim 5, wherein the step of setting the viewpoint and the line of sight further comprises the steps of: translating the intersection on one of the first sectional image and the second sectional image, and resetting at least the viewpoint.

7. A three-dimensional image constructing apparatus, comprising:

a setting device which sets a viewpoint and a line of sight from the viewpoint in an original image formed by stacking a plurality of tomographic images including a volume image;

an image processing device which constructs a projected image by projecting the original image on a projection plane perpendicular to the line of sight from an origin being the viewpoint; and a displaying device which displays the projected image on a monitor screen as a pseudo three-dimensional image, wherein the image processing device constructs a first sectional image including the viewpoint and constructs a second sectional image intersecting the first sectional image at a designated angle, wherein the displaying device displays the first sectional image and the second sectional image simultaneously on the monitor screen as an assistant image assisting to reset the viewpoint and the line of sight.

8. The three-dimensional image constructing apparatus as defined in claim 7, wherein the displaying device displays the pseudo three-dimensional image and the assistant image simultaneously on the monitor screen.

9. The three-dimensional image constructing apparatus as defined in claim 7, wherein the displaying device displays the pseudo three-dimensional image and the assistant image alternately on the monitor screen.

10. The three-dimensional image constructing apparatus as defined in claim 7, wherein the image processing device constructs the second sectional image to be parallel to the line of sight.

11. The three-dimensional image constructing apparatus as defined in claim 10, wherein the displaying device displays the pseudo three-dimensional image and the assistant image simultaneously on the monitor screens.

12. The three-dimensional image constructing apparatus as defined in claim 10, wherein the displaying device displays the pseudo three-dimensional image and the assistant image alternately on the monitor screen.

13. The three-dimensional image constructing apparatus as defined in claim 10, wherein the image processing device constructs the first sectional image to be perpendicular to the line of sight.

14. The three-dimensional image constructing apparatus as defined in claim 13, wherein the displaying device displays the pseudo three-dimensional image and the assistant image simultaneously on the monitor screen.

15. The three-dimensional image constructing apparatus as defined in claim 13, wherein the displaying device displays the pseudo three-dimensional image and the assistant image alternately on the monitor screen.

16. The three-dimensional image constructing apparatus as defined in claim 10, wherein the image processing device constructs the second sectional image to include the viewpoint.

17. The three-dimensional image constructing apparatus as defined in claim 16, wherein the displaying device displays the pseudo three-dimensional image and the assistant image simultaneously on the monitor screen.

18. The three-dimensional image constructing apparatus as defined in claim 16, wherein the displaying device displays the pseudo three-dimensional image and the assistant image alternately on the monitor screen.

19. The three-dimensional image constructing apparatus as defined in claim 16, wherein the setting device resets the viewpoint by moving the viewpoint on the second sectional image by a designated distance.

20. The three-dimensional image constructing apparatus as defined in claim 15, wherein:

the image processing device constructs a third sectional image including the reset viewpoint and parallel to the first sectional image; and the displaying device displays the third sectional image and the second sectional image simultaneously on the monitor screen as a reset assistant image.

21. The three-dimensional image constructing apparatus as defined in claim, 20, wherein:

the image processing device constructs a reset projected image by projecting the original image on the projection plane from the reset viewpoint; and the displaying device displays the reset projected image as a reset pseudo three-dimensional image and the reset assistant image simultaneously on the monitor screen.

22. The three-dimensional image constructing apparatus as defined in claim 20, wherein:

the image processing device constructs a reset projected image by projecting the original image on the projection plane from the reset viewpoint, and the displaying device displays the reset projected image as a reset pseudo three-dimensional image and the reset assistant image alternately on the monitor screen.

23. The three-dimensional image constructing apparatus as defined in claim 16, wherein the setting device translates the line of sight while resetting the viewpoint by moving the viewpoint on the first sectional image by a designated distance.

24. The three-dimensional image constructing apparatus as defined in claim 23, wherein:

the image processing device constructs a third sectional image including the reset viewpoint and parallel to the second sectional image; and the displaying device displays the first sectional image and the third sectional image simultaneously on the monitor screen as a reset assistant image.

25. The three-dimensional image constructing apparatus as defined in claim 24, wherein:

the image processing device constructs a reset projected image by projecting the original image on the projection plane from the reset viewpoint; and the displaying device displays the reset projected image as a reset pseudo three-dimensional image and the reset assistant image simultaneously on the monitor screen.

26. The three-dimensional image constructing apparatus as defined in claim 24, wherein:

the image processing device constructs a reset projected image by projecting the original image on the projection plane from the reset viewpoint; and the displaying device displays the reset projected image as a reset pseudo three-dimensional image and the reset assistant image alternately on the monitor screen.

27. The three-dimensional image constructing apparatus as defined in claim 16, wherein the setting device resets the line of sight by rotating the line of sight on the second sectional image around the viewpoint by a designated angle.

28. The three-dimensional image constructing apparatus as defined in claim 27, wherein:

the image processing device constructs a third sectional image including the viewpoint and perpendicular to the reset line of sight; and the displaying device displays the third sectional image and the second sectional image simultaneously on the monitor screen as a reset assistant image.

29. The three-dimensional image constructing apparatus as defined in claim 28, wherein:

the image processing device constructs a reset projected image by projecting the original image on a reset projection plane perpendicular to the reset line of sight from the viewpoint; and the displaying device displays the reset projected image as a reset pseudo three-dimensional image and the reset assistant image simultaneously on the monitor screen.

30. The three-dimensional image constructing apparatus as defined in claim 28, wherein:

the image processing device constructs a reset projected image by projecting the original image on a reset projection plane perpendicular to the reset line of sight from the viewpoint; and the displaying device displays the reset projected image as a reset pseudo three-dimensional image and the reset assistant image alternately on the monitor screen.

31. The three-dimensional image constructing apparatus as defined in claim 16, wherein the setting device resets the line of sight by turning the second sectional image around an intersection of the first sectional image and the second sectional image by a designated angle.

32. The three-dimensional image constructing apparatus as defined in claim 31, wherein:

the image processing device constructs a third sectional image including the viewpoint and parallel to the reset line of sight; and the displaying device displays the first sectional image and the third sectional image simultaneously on the monitor screen as a reset assistant image.

33. The three-dimensional image constructing apparatus as defined in claim 32, wherein:

the image processing device constructs a reset projected image by projecting the original image on a reset projection plane perpendicular to the reset line of sight from the viewpoint; and the displaying device displays the reset projected image as a reset pseudo three-dimensional image and the reset assistant image simultaneously on the monitor screen.

34. The three-dimensional image constructing apparatus as defined in claim 32, wherein:

the image processing device constructs a reset projected image by projecting the original image on a reset projection plane perpendicular to the reset line of sight from the viewpoint; and the displaying device displays the reset projected image as a reset pseudo three-dimensional image and the reset assistant image alternately on the monitor screen.

35. The three-dimensional image constructing apparatus as defined in claim 31, wherein:

the image processing device constructs a third sectional image including the viewpoint and perpendicular to the reset line of sight, and constructs a fourth sectional image including the viewpoint and parallel to the reset line of sight; and the displaying device displays the third sectional image and the fourth sectional image simultaneously on the monitor screen as a reset assistant image.

36. The three-dimensional image constructing apparatus as defined in claim 35, wherein:

the image processing device constructs a reset projected image by projecting the original image on a reset projection plane perpendicular to the reset line of sight from the viewpoint; and the displaying device displays the reset projected image as a reset pseudo three-dimensional image and the reset assistant image simultaneously on the monitor screen.

37. The three-dimensional image constructing apparatus as defined in claim 35, wherein:

the image processing device constructs a reset projected image by projecting the original image on a reset projection plane perpendicular to the reset line of sight from the viewpoint; and the displaying device displays the reset projected image as a reset pseudo three-dimensional image and the reset assistant image alternately on the monitor screen.

38. The three-dimensional image constructing apparatus as defined in claim 10, wherein the displaying device displays, on the assistant image, a reference point assisting to reset at least one of the viewpoint and the line of sight.

39. The three-dimensional image constructing apparatus as defined in claim 7, wherein:

the image processing device constructs a third sectional image intersecting the first sectional image and the second sectional image; and the displaying device displays the first sectional image, the second sectional image and the third sectional image simultaneously on the monitor screen as the assistant image.

40. A method of setting a viewpoint and a line of sight, in a three-dimensional image constructing method comprising the steps of: setting a viewpoint and a line of sight from the viewpoint in an original image formed by stacking a plurality of tomographic images including a volume image; projecting the original image on a projection plane perpendicular to the line of sight from an origin being the viewpoint; and displaying the projected image on a monitor screen as a pseudo three-dimensional image, the method of setting the viewpoint and the line of sight comprising the steps of:

constructing a first sectional image including the viewpoint and nonparallel to the line of sight;

constructing a second sectional image including the viewpoint and parallel to the line of sight;

displaying the first sectional image and the second sectional image simultaneously on the monitor screen as an assistant image assisting to reset the viewpoint and the line of sight;

translating the line of sight while resetting the viewpoint by moving the viewpoint on the first sectional image;

constructing a reset projected image by projecting the original image on the projection plane from the reset viewpoint; and displaying the reset projected image as a reset pseudo three-dimensional image.

41. The method of setting the viewpoint and the line of sight as defined in claim 40, further comprising the steps of:

constructing a third sectional image including the reset viewpoint and parallel to the second sectional image; and displaying the first sectional image and the third sectional image simultaneously on the monitor screen as a reset assistant images.

42. A method of setting a viewpoint and a line of sight, in a three-dimensional image constructing method comprising the steps of: setting a viewpoint and a line of sight from the viewpoint in an original image formed by stacking a plurality of tomographic images including a volume image; projecting the original image on a projection plane perpendicular to the line of sight from an origin being the viewpoint; and displaying the projected image on a monitor screen as a pseudo three-dimensional image, the method of setting the viewpoint and the line of sight comprising the steps of:

constructing a first sectional image including tie viewpoint and nonparallel to the line of sight;

constructing a second sectional image including the viewpoint and parallel to the line of sight;

displaying the first sectional image and the second sectional image simultaneously on the monitor screen as an assistant image assisting to reset the viewpoint and the line of sight;

translating the line of sight while resetting the viewpoint by moving the viewpoint on the second sectional image;

constructing a reset projected image by projecting the original image on the projection plane from the reset viewpoint; and displaying the reset projected image as a reset pseudo three-dimensional image.

43. The method of setting the viewpoint and the line of sight as defined in claim 42, further comprising the steps of:

constructing a third sectional image including the reset viewpoint and parallel to the first sectional image; and displaying the third sectional image and the second sectional image simultaneously on the monitor screen as a reset assistant image.

44. A method of setting a viewpoint and a line of sight, in a three-dimensional image constructing method comprising the steps of: setting a viewpoint and a line of sight from the viewpoint in an original image formed by stacking a plurality of tomographic images including a volume image; projecting the original image on a projection plane perpendicular to the line of sight from an origin being the viewpoint; and displaying the projected image on a monitor screen as a pseudo three-dimensional image, the method of setting the viewpoint and the line of sight comprising the steps of:

constructing a first sectional image including the viewpoint and intersecting the line of sight at an intersectional angle;

constructing a second sectional image including the viewpoint and parallel to the line of sight;

displaying the first sectional image and the second sectional image simultaneously on the monitor screen as an assistant image assisting to reset the viewpoint and the line of sight;

resetting the line of sight by turning the line of sight on the first sectional image around the viewpoint;

constructing a reset projected image by projecting the original image on a reset projection plane perpendicular to the reset line of sight from the viewpoint; and displaying the reset projected image as a reset pseudo three-dimensional image.

45. The method of setting the viewpoint and the line of sight as defined in claim 44, further comprising the steps of:

constructing a third sectional image including the viewpoint and intersecting the reset line of sight at the intersectional angle; and displaying the first sectional image and the third sectional image simultaneously on the monitor screen as a reset assistant image.

46. A method of setting a viewpoint and a line of sight, in a three-dimensional image constructing method comprising the steps of: setting a viewpoint and a line of sight from the viewpoint in an original image formed by stacking a plurality of tomographic images including a volume image; projecting the original image on a projection plane perpendicular to the line of sight from an origin being the viewpoint; and displaying the projected image on a monitor screen as a pseudo three-dimensional image, the method of setting the viewpoint and the line of sight comprising the steps of:

constructing a first sectional image including the viewpoint and intersecting the line of sight at an intersectional angle;

constructing a second sectional image including the viewpoint and parallel to the line of sight;

displaying the first sectional image and the second sectional image simultaneously on the monitor screen as an assistant image assisting to reset the viewpoint and the line of sight;

resetting the line of sight by turning the line of sight on the second sectional image around the viewpoint;

constructing a reset projected image by projecting the original image on a reset projection plane perpendicular to the reset line of sight from the viewpoint; and displaying the reset projected image as a reset pseudo three-dimensional image.

47. The method of setting the viewpoint and the line of sight as defined in claim 46, further comprising the steps of:

constructing a third sectional image including the viewpoint and intersecting the reset line of sight at the intersectional angle; and displaying the third sectional image and the second sectional image simultaneously on the monitor screen as a reset assistant image.

\* \* \* \* \*

UNITED STATES PATENT AND TRADEMARK OFFICE
CERTIFICATE OF CORRECTION

PATENT NO.    : 6,411,298 B1
DATED         : June 25, 2002
INVENTOR(S)   : Yoshihiro Goto et al.

It is certified that error appears in the above-identified patent and that said Letters Patent is hereby corrected as shown below:

Title page,
Item [54], Title, should read -- METHOD AND APPARATUS FOR SETTING A VIEWPONT AND A LINE OF SIGHT IN A THREE-DIMENSIONAL IMAGE CONSTRUCTING METHOD --.

Signed and Sealed this

Twenty-sixth Day of November, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.     : 6,411,298 B1
DATED          : June 25, 2002
INVENTOR(S)    : Yoshihiro Goto et al.

It is certified that error appears in the above-identified patent and that said Letters Patent is hereby corrected as shown below:

<u>Title page,</u>
Item [54], Title, should read -- METHOD AND APPARATUS FOR SETTING A VIEWPOINT AND A LINE OF SIGHT IN A THREE-DIMENSIONAL IMAGE CONSTRUCTING METHOD --.

This certificate supersedes Certificate of Correction issued November 26, 2002.

Signed and Sealed this

Twenty-fifth Day of March, 2003

JAMES E. ROGAN
*Director of the United States Patent and Trademark Office*